Aug. 29, 1961 R. R. PECORARO ET AL 2,997,940
METHOD AND CANISTER MEANS FOR MAKING BEVERAGES
Filed May 21, 1958 3 Sheets-Sheet 1

INVENTORS
Ralph R. Pecoraro,
Angelo S. Sinatra &
BY Edward J. Dziedziula
Jerome Bauer
ATTORNEY INVENTORS
Ralph R. Pecoraro,
Angelo S. Sinatra &
BY Edward J. Dziedziula Jerome Bauer
ATTORNEY.

Aug. 29, 1961 R. R. PECORARO ET AL 2,997,940
METHOD AND CANISTER MEANS FOR MAKING BEVERAGES
Filed May 21, 1958 3 Sheets-Sheet 3

INVENTORS
Ralph R. Pecoraro,
Angelo S. Sinatra &
BY Edward J. Dziedziula

Jerome Bauer
ATTORNEY.

2,997,940
METHOD AND CANISTER MEANS FOR MAKING BEVERAGES

Ralph R. Pecoraro, Islip, Angelo S. Sinatra, Massapequa Park, and Edward J. Dziedziula, Massapequa, N.Y., assignors to Ref Manufacturing Corporation, Mineola, N.Y., a corporation of New York
Filed May 21, 1958, Ser. No. 736,879
9 Claims. (Cl. 99—315)

This invention relates to a method and canister means for making beverages by passing a fluid through a selected beverage producing ingredient.

The invention has particular application to automatic beverage making devices of the type disclosed in co-pending application Serial No. 736,771 filed May 21, 1958. The beverage making device of the type disclosed in the co-pending application is generally employed in aircraft galley equipment where it is important that the process for making beverages by the stewardess be substantially automatic, requiring very little of her attention or time as not to distract her from other tasks and duties. For this reason, the instant invention has particular application with such apparatuses yet it will be recognized that its use is also applicable to beverage making devices in general.

Accordingly, an object of the invention is to provide a method for making beverages quickly and easily substantially without care or attention on the part of the stewardess, requiring little or no special skill or aptitude to perform and automatically makes the beverage when once the process is set into operation.

Another object of the invention is to provide a canister apparatus that may be conveniently employed in the method of the instant invention.

To obviate the necessity of a skilled operator and the constant attention of such operator, it is another object of the invention to provide a canister structure for containing a selected beverage producing ingredient in such manner that a fluid may be infused therewith automatically to produce a beverage having a desired taste and consistency.

Another object of the invention resides in the provision of a canister structure that is formed in a plurality of separable parts easily secured together to define a chamber in which the beverage producing ingredient may be contained for future use and separable for cleaning and refilling after use at some future time and location.

Another object of the invention is to provide a canister that will filter the beverage before the same is drawn for drinking to insure that it will be free of the beverage producing ingredients.

Other and further objects of our invention reside in the structures and arrangements hereinafter more fully described with reference to the accompanying drawing in which.

Figure 4:
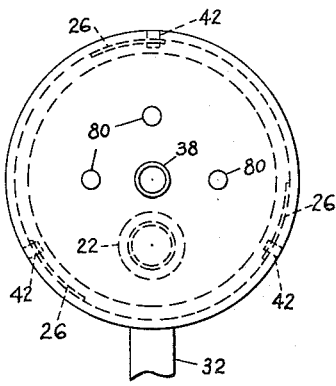
FIG. 4 is a top view of the canister of FIG. 3.
Figure 2:
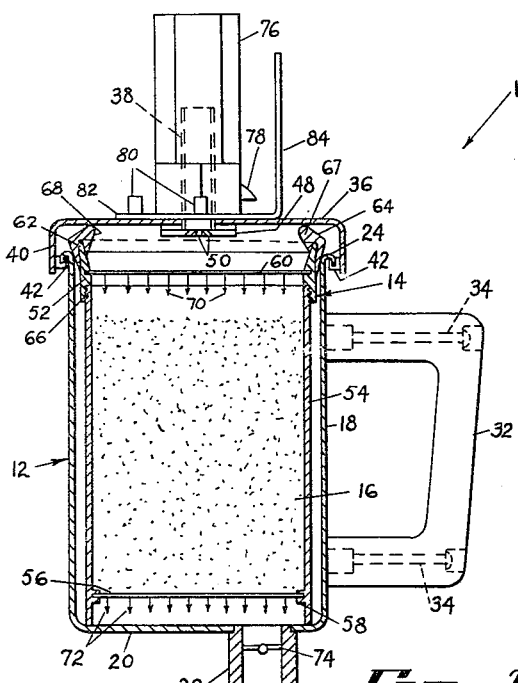
FIG. 2 is an assembled plan view of the apparatus of FIG. 1 shown in section.
Figure 3:
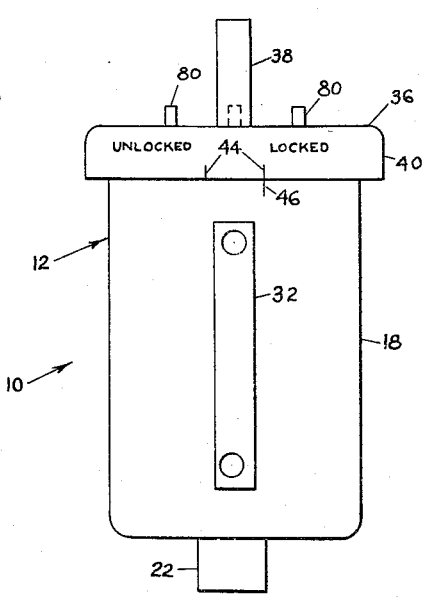
FIG. 3 is a side view of the canister apparatus.
Figure 1:
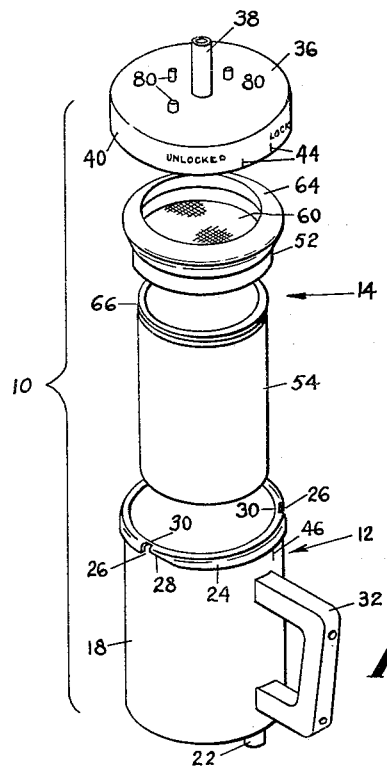
FIG. 1 is an expanded view of a canister apparatus constructed in accordance with the teaching of the invention.

Referring now to FIGS. 1 to 4 inclusive of the drawings, the overall canister apparatus disclosed is generally identified by the numeral 10. Canister apparatus 10 comprises an outer body or canister structure generally identified 12 and a reusable inner body or canister structure generally identified 14. The inner canister structure is adapted to contain a quantity of beverage producing ingredient 16 (FIG. 2).

Outer canister structure 12 includes a lower cup-like body 18 having a base or bottom surface on which a depending fluid outlet or exhaust 22 is mounted. In the drawing, the outlet is positioned eccentrically on the base 20. In actual use, this position of the outlet directs the beverage exhausted or drawn from the canister to a specific location wherein a Silex or other similar structure may be placed. Hence, the precise location of the outlet 22 may be varied to meet specific operating space limitations.

The cup-like side wall 18 of the structure 12 projects upwardly from the base 20 and is turned over about itself at the topmost end thereof to form a substantially inverted U-shaped lip 24 that is radially spaced from the wall 18. Defined on the lip surface are a plurality of a circumferentially spaced periphery extending securing notches or sockets 26. The securing or locking sockets 26 each include inclined wedging surfaces 28 that terminate at their high ends in radially extending slots 30. A handle 32 is mounted on the outer surface of the wall 18 in any convenient manner by screws 34 for easy manipulation or handling at the body of the apparatus 10.

Included in the outer canister structure 12 is an upper head or cover member 36 having an inlet tube 38 mounted thereon. The head is adapted to releasably join with the body member to define a substantially closed chamber therewith. Head 36 is also substantially cup-shaped but inverted to provide a downwardly extending peripheral wall 40 that is adapted to fit in circumposition about the lip 24. Mounted on the interior wall 40 are a plurality of securing elements in the form of pins 42 positioned for locking cooperation with the inclined surfaces 28.

The deep radial slots 30 serve to accommodate the entry of the pins 42 to facilitate the upward movement of the cup-like body 18 about the lip 24. With the pins 42 in position within the sockets 26, the head 36 and body 18 may be rotated relative to each other to cause the pins to ride down their respective inclined locking surfaces 28 to wedgingly engage therewith. The operator may immediately recognize when the outer canister head and body are secured together since indices 44 are provided on the head 36 for rotative alignment with indices 46 on the body 18.

Inlet 38 projects downwardly through the head 36 and terminates in a fluid spray nozzle 48 (FIG. 2). The spray nozzle 48 may be of any convenient form. In the drawing, it is shown provided with a plurality of orifices 50, each of which are directed to disperse the fluid from the inlet 38 into the closed chamber of the outer canister 12 in the form of a fine spray for a purpose to be described.

The inner canister 14 is adapted to serve as a unitary structure in which a quantity of a selected beverage producing ingredient 16 as coffee, or the like, may be contained. It comprises top and bottom plastic members 52 and 54 respectively molded of heat-resistant rigid polyethylene. Formed integral with, and longitudinally spaced from the end of the lower member 54, is a fine wire mesh screen or filter means 56. To insure against the accumulation of fine particles in the peripheral edge of the screen, the same is molded integral with a radial web 58 that is a unitary part of the member 54. The top plastic member 52 also includes a fine wire mesh screen or filter means 60 that is molded integral therewith.

Member 52 has an upper marginal end 62 that flares radially outward to support a fluid seal or element 64. The members 52 and 54 may be releasably secured together intermediate their ends by any suitable means, as the threaded engagement 66. When the two members are thus secured together, their filter means 56 and 60 are arranged in longitudinal spaced relationship to define a chamber in which the beverage producing ingredient 16 may be contained.

The sealing element 64 is seated on the flared end 62 and also flares radially outward. Its uppermost end 67 is then turned radially inward and downward. This uppermost radial inward extension 67 of the sealing element is flexible and yieldable throughout its periphery for progressive greater fluid-tight surface sealing engagement with the undersurface of the head 36.

When utilizing the canister apparatus 10 in connection with the beverage making device of the aforementioned co-pending application, the galley is stocked with a number of inner canister structures 14 that have been previously cleaned and filled with the proper amount and type of beverage producing ingredient, viz. coffee grounds. The inner canisters are stored in the galley for future use by the stewardess. Hence, when the stewardess desires to make a beverage, as coffee, it is merely necessary for her to take from stock an inner canister structure 14 that contains the desired coffee beverage producing ingredients.

The inner canister 14 is inserted in the shell 18 of the outer canister 12 with its bottom member 54 supported on the lower surface 20. In this position, the lowermost filter means 56 is longitudinally spaced from the outlet 22 and the radial space between the smaller inner canister 14 and the larger outer canister 12 is sealed fluid tightly by the sealing element 64 that abuts and yieldingly conforms to the shape of the top of the lip 24.

The inner canister 14 is securely retained in this position by lowering the cover 36 into joining relationship with the shell 18. As the cooperating engaging structure 26, 42, moves into greater wedging locking engagement in response to the relative rotation of the head and body members 36 and 18, the top of the sealing element 64 is bent or flexed downwardly into progressively greater sealing engagement with the interior surface of the head. This coaction defines a fluid-tight seal between the head and across the inner and outer canisters at the lip 24. The surface 68 of the sealing element is thus retained between the head and the inner canister in its normally inclined position. It serves to direct the peripheral edge of the fluid spray emanating from the orifices 50 down toward the filter means 60 and fluid-tightly seal the outer and inner canister structures.

When making coffee, the fluid introduced into the canister 12 in the form of a spray from the nozzle 48 is hot water. The seal 64 prevents hot water from entering the space between the inner canister 14 and the outer canister 12. As the water sprays on to the filter means 60 and passes through the same, it is more finely dispersed and ensures an equal distribution of the same over the top of the quantity of coffee ingredient 16 therebeneath. The finely divided particles of hot water thus diffused, filter through the screen in the direction of the arrows 70 downward through the coffee ingredient 16 to completely permeate the same and become infused therewith.

The hot water thus drains through the coffee ingredient 16 evenly and after becoming infused therewith, is filtered at the lower end 56 as it passes out of the inner canister in the direction of the arrows 72. In practice, a suitable valve structure 74 (FIG. 2) may be included in the outlet 22 to vent or exhaust the filtered coffee beverage from the canister apparatus 10. The outlet valve may be adjustable to permit the exhaust of the coffee beverage from the apparatus 10 at a rate that is slower than that at which the hot water is sprayed into the canister 14.

The assembled apparatus 10 is adapted to be mounted to the coffee making device of the co-pending application, or to a similar device, by inserting the inlet tube 38 into any well known plug connector 76 that may be mounted at the fluid outlet portion of such device. The plug connector 76 may have an engaging finger-operated lever 78 that will automatically lock and secured the tube 38 and the attendant apparatus 10 in place on such coffee making device to permit the entry of hot water thereinto for thorough leaching of the ingredients 16 in the manner previously described. If the inlet 38 is eccentrically mounted on the head 36 rather than centered thereon, it may be properly located by the provision of locking pins 80 that are unequally spaced and predeterminately arranged to project upwardly from the head 36 for mating alignment with similarly spaced openings (not shown) provided in a leg 82 of a locking bracket 84.

Those skilled in the art will readily recognize that in order to obtain a beverage of the same consistency during each leaching operation, the strength of the ingredient 16 must also be substantially consistent. For this reason, it is necessary to substitute further ingredients for the used ingredients after the same has had a predetermined amount of use. It is for this reason that the galley is stocked with the numerous inner canisters 14 containing the same type of beverage producing ingredient. When the stewardess desires to substitute a fresher quantity of ingredient 16 for that which has been used, she need only rotate the shell 18 relative to the head 36 that is secured in the plug 76. Rotation may be accomplished by manipulating the handle 32 until the indicator 46 thereon moves from the "locked" to the "unlocked" indicator 44.

The shell 18 is then lowered away from the head 36 still secured in the connector 76, and the complete inner canister structure 14 dumped therefrom into a suitable container for cleaning and refilling at a future time and place for reuse. A new canister 14, having a fresh supply of ingredient therein, is then inserted into the now empty shell 18 and secured in place beneath the head 36 in the outer canister 12. This is accomplished by raising the shell 18 to the head 36 that remains secured in the plug 76. The slots 30 of the locking means 26 are aligned with the pins 42 by aligning the indicator 46 with the "unlocked" indicator 44. The shell is then rotated by manipulation of the handle 32 until the pins ride down the surfaces 28 and the indicator 46 moves into alignment with the "locked" indicator 44.

The process of making coffee or any other beverage is performed in the same manner as previously described. When it is desired to clean the whole apparatus 10, the same may be released from the plug connector 76 by simply actuating the lever 78 to disengage the tube 38. The apparatus will then fall away from the plug and the head and body of the outer canister 12 may be separated by relative rotation in the manner above described. The upper and lower rigid plastic members 52 and 54 may be separated by disengaging the same at their threaded connection 66.

Figure 6:
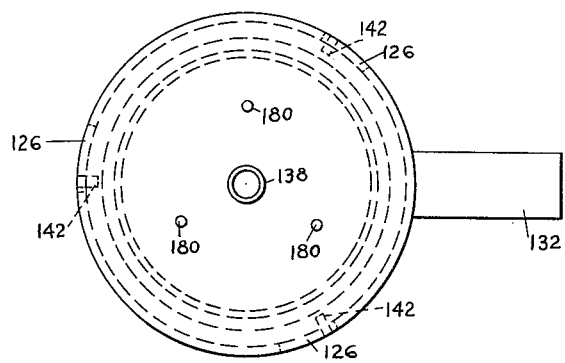
FIG. 6 is a top view of FIG. 5.
Figure 5:
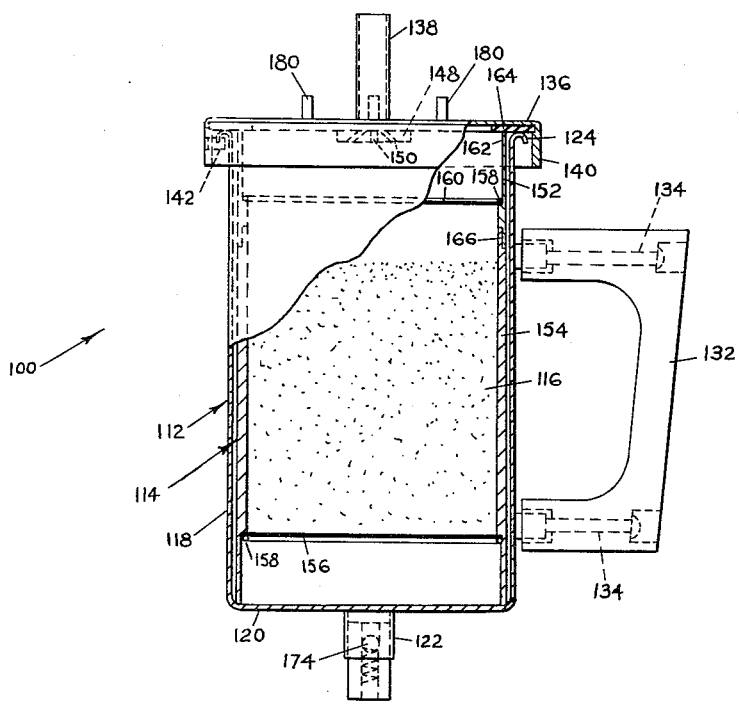
FIG. 5 is a plan view of a modified canister apparatus with a portion thereof shown in section.

The canister apparatus in FIGS. 5 and 6 is generally identified by the numeral 100. The overall canister apparatus 100 is similar in structure and function to the apparatus 10 previously described. For this reason similar parts are identified by similar numerals with the exception that the identifying numerals relating to the embodiment 100 are in the one hundred series.

Teh canister apparatus 100 comprises an outer canister structure 112 and an inner canister structure 114 within which there is adapted to be contained a beverage producing ingredient 116. The outer canister structure comprises a shell-like body 118 having a base 120 on which there is located an exhaust or drain outlet 122. The exhaust outlet 122 is positioned in the diametric center of the base 20 although it will be apparent that its location may be changed for the purposes described in the prior embodiment 10.

The body 118 is provided with an inverted U-shaped lip 124 that has defined on the surface thereof peripherally extending locking notches or sockets 126. The engaging sockets 126, are of the same structural details as the sockets 26, including radial extending slots and inclined wedging engaging surfaces that are adapted to cooperate for locking engagement with pins 142 provided on the upper head or cover member 136.

A handle 132 is suitably mounted on the wall of the body 118 by pins or screws 134 for easy maneuvering. Centrally mounted in the head 136 is an inlet structure 138 that projects downwardly through the head to terminate in a nozzle structure 148 having orifices 150. The nozzle 148 is adapted to spray fluid from the tube 138 into the inner canister structure 114. The head 136 is provided with a downwardly extending outer peripheral wall 140 that is adapted to be positioned about the lip 124 to locate the pins 142 thereon in engagement with the sockets 126 to securely join the head and body members together. Although it is not shown in FIGS. 5 and 6, the head and body members 136 and 118 may be provided with indices 44 and 46 to indicate their locked and unlocked positions in the same manner described with respect to embodiment 10.

Inner canister structure 114 is formed in two parts and includes members 152 and 154, each of which are rigid in construction formed of a non-tarnishing metal as stainless steel. The lower member 154 has a fine wire mesh screen or filter means 156 that is secured thereto by pure tin soldering or welding the same thereto at 158. The member 152 also is provided with a fine wire mesh screen 160 that is conveniently secured thereto by pure tin soldering or welding at 158. The two members 152 and 154 are adapted to nest together intermediate their ends with a slight frictional engagement by the arrangement of cooperating undercut or stepped surfaces 166. The releasable securing engagement of members 152 and 154 at 166 serves to longitudinally space the filter means 156 and 160 from each other to define therebetween a space within which the beverage producing ingredient 116 may be removably contained.

A resilient, pliable or yieldable washer sealing element 164 is mounted on the lower surface of the cover 136 for sealing engagement with the lip 124 of the body 118 and the upper end 162 of the member 152. The cooperative engagement defined between the sealing element 164 with the end 162 and the lip 124, insures a fluid-tight closure of the radial space between the inner and outer canister structures 114 and 112 respectively at the cover 136 and, further, between the cover 136 and the body 118.

The operation of the instant embodiment is very much similar to that previously described with respect to the embodiment 10. The inlet tube 138 may be secured in a plug connector (76 not shown) while the cover 136 may be located in a predetermined manner with respect to a bracket 84 by the provision of locking pins 180 projecting upwardly from the cover 136. Fluid introduced by way of the tube 138, is conveyed to the spray nozzle 148 and diffused in spray form through the orifices 150 onto the filter means 160.

The filter means 160 serves to further diffuse the particles of fluid so that the same will seep therethrough and drip downwardly upon the top of the quantity of beverage producing ingredient 116. The finely diffused particles of fluid thus thoroughly permeate the ingredient 116 and, while draining through it, becomes infused therewith. The beverage infused fluid is then filtered at the lower filter means 156 to remove therefrom all particles of the beverage producing ingredient. The now infused fluid is drained from the inner canister 114 by way of the outlet 122 that may be provided with a valve structure 174. If the valve 174 is utilized, it may be adjusted by the threading of a screw against the spring urging the valve 174 to permit the exhaust of the fluid at a rate slower than that which the fluid enters the inner canister by way of the inlet 138 and after a predetermined amount of the fluid has become infused with the ingredient 116.

After a predetermined period of use, it is desirable to substitute a fresher beverage producing ingredient 116 for that being used. This is accomplished by rotating the body 118 relative to the head 136 in a manner previously described with respect to the embodiment 10. Upon release of the engagement between the securing structure 126—142, the inner canister 114 may be dropped out of the shell 118 and a new inner canister 114, having fresh ingredients, placed thereinto.

After the shell 118 is joined with the head 136 to securely nest the inner canister 114 therebetween, the process of making a beverage may then be accomplished with the fresh ingredient in the same manner as was accomplished with the used ingredient. The discarded canister structure 114 is adapted to be easily separated and cleaned by disengaging the members 152 and 154 from each other at their area of jointure 166. The ingredient remaining in the lower portion 154 may then be removed and both members cleaned and refilled with a new ingredient.

Figure 8:
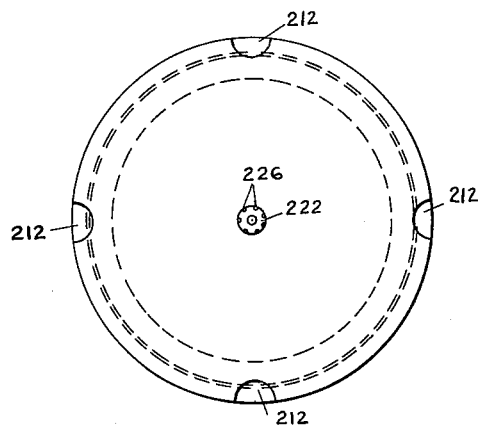
FIG. 8 is a top view of FIG. 7.
Figure 7:
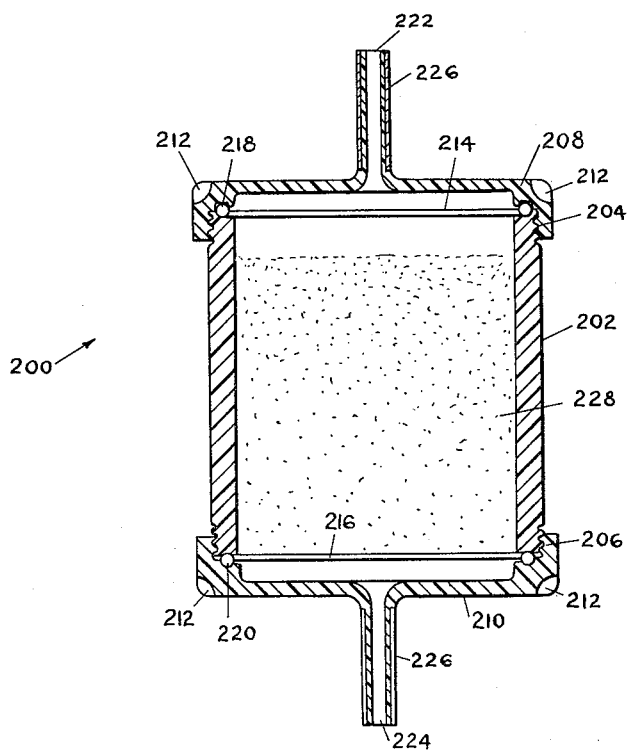
FIG. 7 is a sectional plan view of a further canister apparatus.

The reusable canister shown in FIGS. 7 and 8, is generally identified by the numeral 200 and comprises a body member 202 molded of rigid heat-resistant plastic material. The body member 202 is threaded at its opposite ends 204 and 206 for secure cooperative threaded engagement with removable head or cover members 208 and 210. Each cover member is provided with a plurality of circumferentially spaced finger grips 212 adapted to facilitate easy and rapid threading manipulation of the same relative to the body 202. Fine wire mesh screens or filter means 214 and 216 at secured at their peripheral edges to rings 218 and 220 to be securely mounted between the covers 208 and 210 when the same are joined to the body 202.

Each cover member 208 and 210 also may be molded of heat-resistant substantially rigid plastic material to withstand the high temperature of hot fluids that may come into contact therewith or formed of stainless steel. The head members each have tube-like extensions 222 and 224 respectively through which a fluid is to be conveyed. In order to prevent wear on the tubes 222 and 224 if formed of plastic material during their insertion into and removal from locking cooperation with a plug connector of the type 76 previously described, a plurality of metallic wear-resistant inserts 226 may be molded integral with and in spaced relationship about the periphery of each tube.

From the description, it will be recognized that the cover members 208 and 210, molded of a heat-resistant plastic material, are identical in structure and therefore may be reversibly arranged for securement and threaded engagement on either end of the body 202 without detriment to the operation of the canister apparatus 200. With the filter means 214 and 216 secured in position between the ends of the body 202 and the respective cover members 208 and 210, there is defined therebetween, a longitudinal space within which a beverage producing ingredient 228 is adapted to be removably contained while the filter rings 218 and 220 serve as sealing elements to fluid-tightly seal their respective covers and body.

The apparatus 200 is employed in substantially the same manner as the prior described embodiment. One of the tubes 222 or 224 may be inserted into the connector 76 for automatic locking engagement therein. Inasmuch as the body 202 will not conduct heat readily, it requires no handle structure and therefore may be manually grasped about its outer periphery. The use of locking pins for cooperation with a locking bracket, as was necessary in the prior described embodiments is obviated. When once locked in position in the plug connector, fluid entering the inlet tube 222 is forced onto the filter means 214. The fluid is diffused as it spreads out over and seeps through the fine openings of the filter means to drain downwardly on to the top of the quantity of beverage producing ingredient 228 contained in the canister structure 200.

As the finely diffused particles of fluid drain through the canister they thoroughly permeate and become infused with the beverage producing ingredient. The infused fluid is thereafter filtered free of the ingredient at 216 as it is exhausted through the tube 224 of the lever cover member.

While there have been shown and described and pointed out the fundamental novel features of the invention as applied to several preferred embodiments thereof, it will be understood that various omission and substitutions and changes in the form and details of the devices illustrated and in their operations may be made by those skilled in the art, without departing from the spirit of the invention. It is the intention, therefore, to be limited only as indicated by the scope of the claims appended hereto.

We claim:

1. Means for use in a beverage making apparatus comprising a circular body having an outlet at the bottom thereof, a fully imperforate side walled canister within and radially spaced from said body including a pair of longitudinally spaced separable filter means between the top and bottom of said canister defining a space therebetween in which a beverage producing ingredient may be contained, a cover releasably engaged with said body to secure said canister in said body and removable from said body to enable removal of said canister from said body and the separation of said filter means for removal of said beverage producing ingredient therefrom, a source of fluid, a fluid inlet in said cover to communicate said fluid to said space for infusion of said beverage producing ingredient, and sealing means on said cover extending between said body and canister to form a fluid-tight seal across the radial space therebetween.

2. A structure comprising an outer canister including an outer body and a head removably secured thereto, said head having a fluid inlet and said body having a fluid outlet at the bottom thereof, a fully imperforate side walled inner canister radially spaced within said outer canister and bodily removable therefrom, said inner canister including lower and upper two-part separable members defining a chamber, said members each including means separably joining the same together to define said chamber, filter means in the lower part of said two-part canister and spaced from said fluid outlet, filter means in the upper part of said two-part canister, and sealing means cooperating with said head and said inner and outer canisters to define a fluid-tight seal between said head and canisters and across the radial space between said canisters.

3. A canister apparatus comprising, an outer canister including a head and body relatively rotatable for releasable securement and defining a substantially closed chamber having a fluid inlet and outlet means on said head and body respectively said head and body coacting to releasably secure the same together, a reusable inner canister mounted in said outer canister and radially spaced for removal therefrom, said inner canister including a plurality of heat-resistant plastic members, means releasably securing said plastic members together to define a chamber in which a beverage producing ingredient may be contained, filter means molded integral with said plastic members, each of said filter means being longitudinally spaced from said fluid inlet and outlet respectively, and means mounted on said head in fluid-tight sealing engagement between said head, one of said plastic members and said body to seal said radial space fluid tightly.

4. A canister apparatus comprising an outer canister having a head and body relatively movable for releasable securement to each other, a fluid inlet in said head, a fluid outlet in said body, an inner canister radially spaced within said outer canister and including releasably engageable top and bottom rigid plastic members each having filter means molded integral therewith and longitudinally spaced from each other to define a chamber in which a beverage producing ingredient may be contained, said top member having a marginal outwardly flared end, and seal means between said flared end and head and movable into fluid tight sealing engagement with said body of said outer canister.

5. A canister apparatus comprising an outer canister including relatively movable head and body members, said head having fluid inlet means, said body being cup-shaped and having fluid outlet means at the lower end thereof, releasable connection means on said head and body cooperating to join said head and body together and responsive to the relative movement of said body and head members to release said connection, a reusable inner canister having a fully imperforate outer side wall and a plurality of connected members each including filter means for containing a beverage producing ingredient for infusion by said inlet fluid, said inner canister being in radially spaced relationship in said body and removably enclosed in said releasably joined head and body, flexible seal means coacting between said inner canister and said head and moved by the joining connection of the head and body to flex and provide a fluid-tight seal between said inner and outer canisters.

6. A canister apparatus as in claim 5, said inner canister including upper and lower longitudinally spaced filter screens molded integral with upper and lower separable members respectively molded of rigid plastic to define a beverage producing ingredient infusion chamber, said seal means having a surface thereon to direct the inlet fluid to said chamber.

7. A canister apparatus as in claim 5, means on said head to secure the same in a fixed position during the relative movement of said body and head members to release the connection and joint between the body and head to enable the removal of said inner canister from its enclosure within said outer canister.

8. A coffee making canister apparatus comprising circular inner and outer removably nested canisters, said inner radially spaced canister including a pair of upper and lower fully imperforate outer side walled members defining a longitudinally extending space for containing a coffee producing ingredient, means on said members joining the same to complete said longitudinally extending space, a filter screen on each of said members at the upper and lower ends respectively of said chamber; said outer canister including relatively rotatable body and head members, means operable in response to the relative rotation of said body and head to removably join the same together, a source of hot water, inlet means in said head to admit the hot water into said outer canister and spray the same into said inner canister for infusion with the coffee producing ingredient therein, outlet means in said body to exhaust the coffee infused hot water from said inner canister, and seal means between said inner and outer canisters to seal the same and the radial space therebetween fluid tightly upon the relative rotative engagement of said head and said body members.

9. A canister apparatus comprising an inner canister including a wall having longitudinally spaced top and bottom filter means defining a chamber therebetween in which a beverage producing ingredient may be contained, an outer canister including releasably secured head and body members removably enclosing the inner canister in radial spaced relationship therein, said outer canister having a fluid inlet spray means to spray fluid into said inner canister for dispersed infusion with the beverage producing ingredient in said chamber, and a fluid outlet beneath said bottom filter means to exhaust the beverage infused fluid from said inner canister after the same has been filtered by said bottom filter means, said inner canister having a bottom member on which said bottom filter means is secured, a top member on which top filter means is secured, said top and bottom members having surface means cooperatively engaged with each other, and seal means on said head coacting between said head, one of said inner canister members and said body to provide a fluid-tight seal therebetween and across said radial space between said inner and outer canisters.

References Cited in the file of this patent

UNITED STATES PATENTS

| | | |
|---|---|---|
| 19,780 | Babin | Mar. 30, 1858 |
| 384,411 | Babin | June 12, 1888 |
| 912,634 | Warburton | Feb. 16, 1909 |
| 1,187,419 | Duke | June 13, 1916 |
| 1,774,980 | Lambert | Sept. 2, 1930 |
| 2,263,610 | Cain | Nov. 25, 1941 |
| 2,338,140 | States | Jan. 4, 1944 |
| 2,633,990 | Simpson | Apr. 7, 1953 |
| 2,798,423 | Klausner | July 9, 1957 |

FOREIGN PATENTS

| | | |
|---|---|---|
| 421,622 | Italy | May 28, 1947 |
| 496,568 | Italy | July 23, 1954 |
| 514,905 | Italy | Feb. 11, 1955 |